United States Patent
Zhou et al.

(10) Patent No.: US 10,999,654 B2
(45) Date of Patent: May 4, 2021

(54) MULTIPLE PORT NETWORK DEVICE WITH DIFFERENTIAL PORTS FOR REDUCED ELECTROMAGNETIC INTERFERENCE AT OPTICAL MODULES

(71) Applicant: CISCO TECHNOLOGY, INC., San Jose, CA (US)

(72) Inventors: Xiaoxia Zhou, Shanghai (CN); Hailong Zhang, Shanghai (CN); Jianquan Lou, Shanghai (CN); Guangcao Fu, Shanghai (CN); Alpesh U. Bhobe, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/507,853

(22) Filed: Jul. 10, 2019

(65) Prior Publication Data

US 2021/0014583 A1    Jan. 14, 2021

(51) Int. Cl.
*H04Q 11/00* (2006.01)
*H04B 10/69* (2013.01)
*H04B 10/58* (2013.01)

(52) U.S. Cl.
CPC ......... *H04Q 11/0005* (2013.01); *H04B 10/58* (2013.01); *H04B 10/69* (2013.01); *H04Q 2011/0039* (2013.01)

(58) Field of Classification Search
CPC ........ H04Q 11/0005; H04Q 2011/0039; H04B 10/58; H04B 10/69
See application file for complete search history.

(56) References Cited

U.S. PATENT DOCUMENTS

| | | | | |
|---|---|---|---|---|
| 5,197,097 A | * | 3/1993 | Takahashi | H04J 3/0605 380/268 |
| 5,559,906 A | * | 9/1996 | Maerz | G02B 6/12011 385/3 |
| 5,889,600 A | * | 3/1999 | McGuire | H04Q 11/0001 398/1 |
| 6,222,955 B1 | * | 4/2001 | Lagali | G02B 6/12011 385/20 |
| 6,538,787 B1 | * | 3/2003 | Moeller | G02B 6/272 359/249 |
| 6,574,396 B1 | * | 6/2003 | Dragone | G02B 6/12011 385/24 |
| 6,907,160 B2 | * | 6/2005 | Dragone | G02B 6/12011 385/24 |
| 7,227,395 B1 | * | 6/2007 | Huang | G11C 7/22 327/158 |
| 8,090,047 B2 | | 1/2012 | Fujimori | |
| 8,498,217 B2 | | 7/2013 | Kota | |
| 9,652,020 B2 | | 5/2017 | Wietfeldt | |
| 9,929,776 B2 | | 3/2018 | McCormack | |
| 10,027,504 B2 | | 7/2018 | Wiley | |
| 10,194,565 B2 | | 1/2019 | Zhou | |

(Continued)

*Primary Examiner* — Mina M Shalaby
(74) *Attorney, Agent, or Firm* — Cindy Kaplan (57) ABSTRACT

In one embodiment, an apparatus includes a plurality of optical module ports in communication with a physical layer device in a network device. Communication of signals from the physical layer device to the optical module ports is configured such that the signals received at the optical module ports adjacent to one another are at different phases to reduce electromagnetic interference associated with the optical module ports.

20 Claims, 9 Drawing Sheets

(56) References Cited

U.S. PATENT DOCUMENTS

| | | | |
|---|---|---|---|
| 10,244,297 B1* | 3/2019 | Roth | G02B 6/3546 |
| 2002/0012492 A1* | 1/2002 | Takahashi | H04B 10/299 |
| | | | 385/24 |
| 2002/0044318 A1* | 4/2002 | Hung | H04J 14/0216 |
| | | | 398/83 |
| 2004/0037558 A1* | 2/2004 | Beshai | H04Q 11/0005 |
| | | | 398/57 |
| 2005/0227617 A1* | 10/2005 | Hoffmann | H03F 3/602 |
| | | | 455/13.3 |
| 2010/0142951 A1* | 6/2010 | Armstrong | H04B 10/67 |
| | | | 398/65 |
| 2014/0029083 A1* | 1/2014 | Komljenovic | H01S 5/041 |
| | | | 359/341.3 |
| 2014/0328591 A1* | 11/2014 | Koch | H04J 14/0267 |
| | | | 398/49 |
| 2014/0334764 A1* | 11/2014 | Galland | G02F 1/225 |
| | | | 385/3 |
| 2015/0295636 A1* | 10/2015 | Fujimura | H04B 7/18515 |
| | | | 370/315 |
| 2015/0309258 A1* | 10/2015 | Fincato | G02F 1/0115 |
| | | | 398/87 |
| 2015/0373432 A1* | 12/2015 | Beshai | H04J 14/0282 |
| | | | 398/47 |
| 2016/0274438 A1* | 9/2016 | Shimizu | G02B 6/12 |
| 2016/0306112 A1* | 10/2016 | Munoz Munoz | G02B 6/29347 |
| 2017/0170810 A1* | 6/2017 | Madadi | H03H 19/004 |
| 2017/0187514 A1* | 6/2017 | Morishita | H04L 27/01 |
| 2019/0170875 A1* | 6/2019 | Schmalenberg | G01S 7/4814 |

* cited by examiner

MULTIPLE PORT NETWORK DEVICE WITH DIFFERENTIAL PORTS FOR REDUCED ELECTROMAGNETIC INTERFERENCE AT OPTICAL MODULES

TECHNICAL FIELD

The present disclosure relates generally to multi-port network devices, and more particularly, to reducing electromagnetic interference (EMI) of multi-port network devices.

BACKGROUND

Optical transceiver modules are commonly used in switches and routers. With the development of higher performance electronic devices, system power, number of ports, and frequency continue to increase, resulting in EMI challenges, especially with regard to optical module cages and optical modules.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, an apparatus generally comprises a plurality of optical module ports in communication with a physical layer device in a network device. Communication of signals from the physical layer device to the optical module ports is configured such that the signals received at the optical module ports adjacent to one another are at different phases to reduce electromagnetic interference associated with the optical module ports.

In one or more embodiments, a phase offset between the adjacent optical module ports is approximately 180 degrees.

In one or more embodiments, four of the optical module ports are in communication with the physical layer device.

In one or more embodiments, the apparatus further comprises a plurality of physical layer devices, each of the physical layer devices in communication with a plurality of the optical module ports. In one or more embodiments, a group of the optical module ports in communication with one of the physical layer devices operate at a phase offset from a group of the optical modules in communication with another one of the physical layer devices.

In one or more embodiments, a length of a trace between the physical layer device and one of the optical module ports is adjusted to provide the different phases at the adjacent optical module ports.

In one or more embodiments, an electrical parameter at the physical layer device is adjusted to provide the different phases at the adjacent optical module ports.

In another embodiment, a switch generally comprises a plurality of physical layer devices and a plurality of optical module ports in communication with the plurality of physical layer devices. Communication of signals from each of the physical layer devices to the optical module ports is configured such that the signals received at the optical module ports adjacent to one another are at different phases to reduce electromagnetic interference associated with the optical module ports.

In yet another embodiment, a method generally comprises transmitting electrical signals from a physical layer device to a plurality of optical module ports and offsetting phases between the electrical signals transmitted to optical module ports adjacent to one another to reduce electromagnetic interference associated with the optical module ports.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Optical transceiver modules are used for high speed fiber optic digital communications. Pluggable optical modules allow for easy insertion (or extraction) of the transceivers into (or from) an optical cage on a network device or line card. The optical transceiver module and the optical cage (cage connector, housing) are a common radiation source and contribute to EMI (Electromagnetic Interference) leakage at a front of the network device (location of optical connectors). With an increase in system power, number of ports, and operating frequency, meeting EMI requirements, including RE (Radiated Emission) tests becomes more challenging. The superposition of multi-port radiation rapidly worsens radiation performance. In general, more ports create bigger challenges for radiation tests and EMC (Electromagnetic Compatibility) compliance.

Examples for reducing EMI include shielding and absorption; however, these both have drawbacks. For example, some seams are needed for function, such as a latch of an SFP (Small Form-Factor Pluggable) cage, which either cannot be shielded or is difficult to shield. Due to the limited space availability, there may not be sufficient space to add an RF (Radio Frequency) absorber. Also, absorbers are expensive. These physical changes require additional design time and verification testing, and increase manufacturing costs.

The embodiments described herein set adjacent optical module ports out of phase from one another to reduce EMI in multi-port network devices without any increase (or no significant increase) to cost. In one or more embodiments, an apparatus comprises a plurality of optical module ports in communication with a physical layer device in a network device. Communication of signals from the physical layer device to the optical module ports is configured such that the signals received at the optical module ports adjacent to one another are at different phases to reduce electromagnetic interference associated with the optical module ports. The offset of phases at adjacent ports is referred to herein as differential port.

Figure 1:
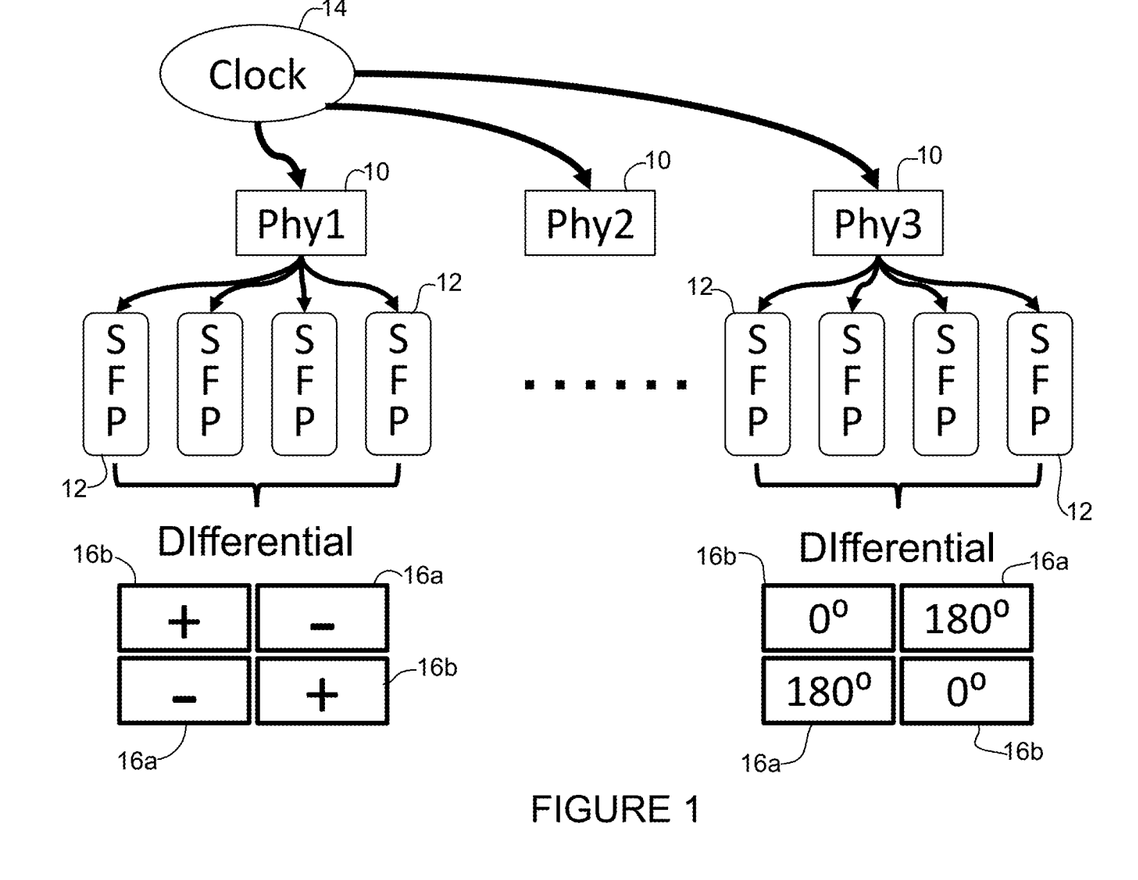
FIG. 1 is schematic illustrating optical module ports in communication with physical layer chips, in accordance with one embodiment.

Referring now to the drawings, and first to FIG. 1, an example of physical layer devices (chips) (PHYs) 10 in communication with SFP modules 12 is shown. The PHYs 10 are connected to a common clock 14. For simplification, the SFP modules 12 are only shown for two of the physical chips 10 (Phy1 and Phy3). Phy2 may similarly be in communication with SFP modules 12. It is to be understood that the simplified schematic shown in FIG. 1 is only an example and that the system (network device, network equipment, line card, route processor card, etc.) may include any number of PHYs 10, each in communication with any number of optical modules 12 (e.g., SFP or any type of pluggable optical module).

The optical modules 12 (pluggable optical modules, transceivers, optical transceivers) may comprise any type of pluggable optical module in any form factor including, for example, SFP (Small Form-Factor Pluggable), QSFP (Quad Small Form-Factor Pluggable), QSFP+, QSFPDD (QSFP Double Density), QSFP28, CFP (C Form-Factor Pluggable), CFP2, CFP4, CFP8, CPAK, OSFP (Octal Small Form-Factor Pluggable). The pluggable optical modules 12 operate as an engine that converts electrical signals to optical signals or in general as the interface to the network element copper wire or optical fiber. Hosts for these pluggable modules include line cards (line cards, fabric cards, controller cards, etc.) used on switches, routers, edge products, and other network devices. The optical modules 12 may be configured to support gigabit Ethernet, Fibre Channel, or other communications standards. The optical modules 12 may comprise one or more front connectors (e.g., LC or other suitable connector) for communication with other network devices.

The optical modules 12 are inserted into an optical module cage. The optical module cage comprises connectors (interfaces) for connecting the optical modules 12 with electronic components on a line card or other electronic component (host) operable to utilize transceivers and interface with a telecommunications network. The cage includes a connector for one or more electronic components that emit electromagnetic energy, and an opening configured to receive the optical module 12 that connects to the one or more electronic components through the connector.

The optical module cage may include openings for receiving optical modules in a stacked or side-by-side arrangement (e.g., 2×1 (two rows with one module port in each row) (stacked), 1×2 (1 row with two module ports) (side-by-side), 1×4 (1 row with four ports), 2×2 (two rows, two module ports in reach row) (FIG. 1), 2×4 (two rows, four module ports in each row), etc.). The term "stacked" as used herein refers to one optical module port positioned in a location vertically above another optical module port and the term "side-by-side" as used herein refers to two optical module ports positioned horizontally adjacent to one another. It is to be understood that the terms above/below, horizontal/vertical, or front/rear are relative to the position of the cage and also cover other orientations of the cage. Thus, the terms are used only for ease of description and are not to be interpreted as limiting the arrangement of ports or components. The optical module cage may be designed for compatibility with various optical form factors including SFP, QSFP, QSFPDD, OSFP, CFP, CPAK, or any other current or future form factor.

The example of FIG. 1 shows four optical module ports 16a, 16b arranged in a 2×2 configuration. The term adjacent optical module ports as used herein may refer to two ports in a side-by-side or stacked arrangement. In the example shown in FIG. 1, ports 16a are adjacent to ports 16b (i.e., each port 16a has two adjacent ports 16b). As described in detail below, adjacent optical module ports operate at different phases to reduce EMI associated with the optical module port (e.g., EMI from the optical module, optical module cage, connector, multiple ports).

The term optical module port (also referred to as port or optical module cage port) refers to the interface at the optical module receiving a signal and optical cage transmitting the signal received from the physical layer device. Phases of adjacent ports 16a, 16b are constrained such that they are out of phase (i.e., operate at different phases, receive signals at different phases) with neighbor ports (indicated by "+" and "−" or "0°" and "180°" in FIG. 1) so that the combined radiation energy cancels each other at the direction of maximum radiation. In one example, the amplitude of the signal received at two diagonal ports 16a is 1 while the amplitude of the signal received at the other two diagonal ports 16b is −1, wherein the amplitude of −1 changes the phase 180° for full band. As described below with respect to FIGS. 2A and 2B, transmission (communication) of the signals may be modified such that they are received out of phase at the SFP 12 through physical change to specific traces between the PHY 10 and SFP 12 or changes may be made to electrical parameters at the PHY 10 such that the received signals are out of phase for adjacent optical module ports 16a, 16b.

Figure 2A:
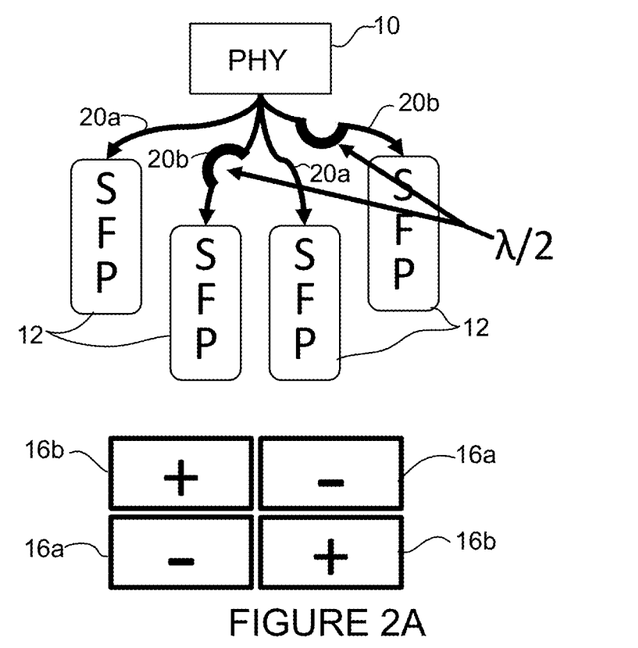
FIG. 2A is a schematic of the optical module ports shown in FIG. 1 with adjusted trace length between the physical layer chip and two of the optical module ports to provide phase offset between adjacent ports, in accordance with one embodiment.
Figure 2B:
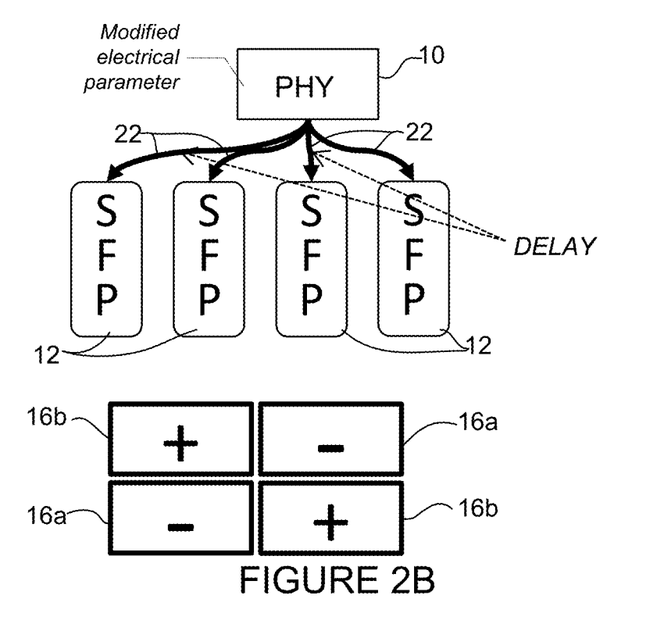
FIG. 2B is a schematic of the optical module ports shown in FIG. 1 with modified electrical parameters at the physical layer device to provide phase offset between adjacent ports, in accordance with one embodiment.

Referring now to FIGS. 2A and 2B, FIG. 2A illustrates a physical change to traces between the PHY 10 and SFP 12 and FIG. 2B illustrates an electrical change at the PHY to provide electrical signals at adjacent ports that are out of phase from one another.

The PHY 10 is in communication with the optical modules 12 through traces 20a, 20b in FIG. 2A. In one embodiment, a length of the trace 20b between the PHY 10 and the optical module 12 is adjusted for two of the four modules, as shown in FIG. 2A. In order to obtain the phase offset between adjacent ports 16a, 16b, an extra $\lambda/2$ length is added to the two traces 20b to increase the length over the trace 20a. In one example, for 25 G, $\lambda/2$ is 6 mm in vacuum (and is shorter in PCB (Printed Circuit Board)). The length of two of the traces may also be reduced by $\lambda/2$. It is to be understood that these are only examples, and other changes may be made to the traces to constrain the phase of adjacent ports 16a, 16.

In another embodiment, the length of traces 22 between the PHY 10 and SFPs 12 are uniform and an electrical parameter is changed to implement differential port. In the example shown in FIG. 2B, a delay (phase) is adjusted at the PHY chip 10 to compensate skew. For example, a DAC (Digital to Analog Conversion) parameter may be adjusted. The electrical parameter may be adjusted at the PHY 10 to get 180° phase shift for a specified frequency, for example.

Figure 3A:
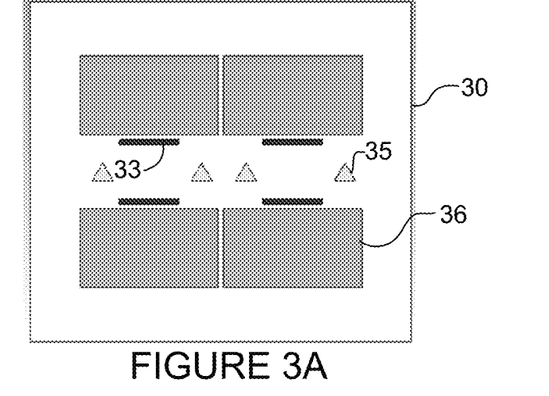
FIG. 3A is a schematic front view of a simulation model for a 2×2 optical cage.
Figure 3B:
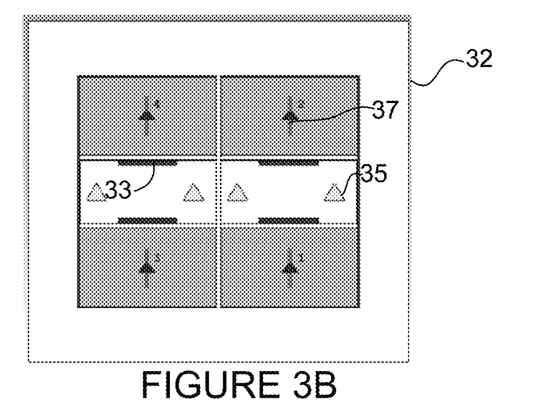
FIG. 3B is a schematic rear view of the simulation model of FIG. 3A with vertical polarization.
Figure 3C:
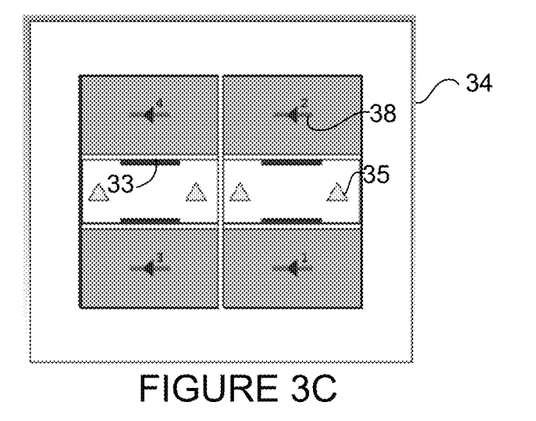
FIG. 3C is a schematic rear view of the simulation model of FIG. 3A with horizontal polarization.

FIG. 3A is a front view of a simulation model of a 2×2 optical cage 30 with four modules 36. Latches 33 and light pipes 35 are openings, which allow radiation emission. FIGS. 3B and 3C are rear views of simulation models 32, 34 showing vertical polarization 37 and horizontal polarization 38, respectively. The differential port embodiments described herein may be implemented with vertical or horizontal polarization. Simulation results for the models shown in FIGS. 3B and 3C are described below with respect to FIGS. 5A and 5B.

Figure 4A:
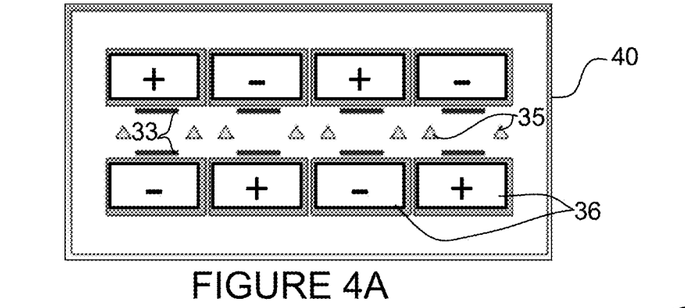
FIG. 4A is a schematic illustrating differential ports in a 2×4 arrangement.
Figure 4B:
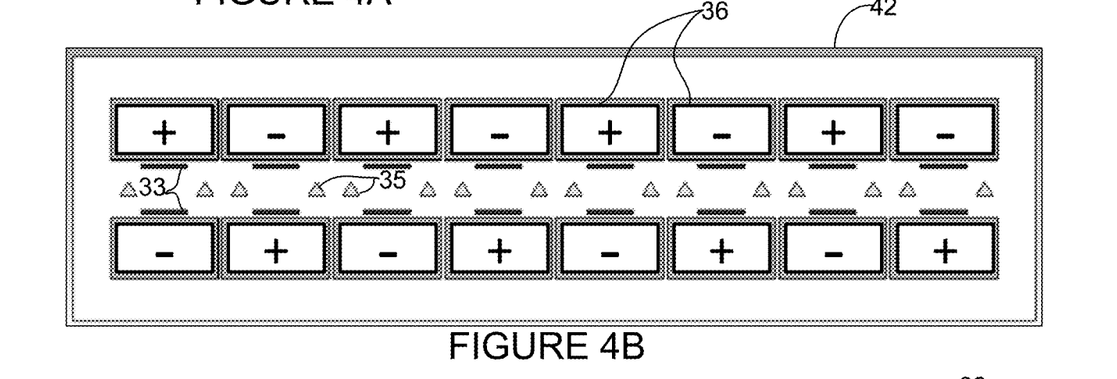
FIG. 4B is a schematic illustrating differential ports in a 2×8 arrangement.
Figure 4C:
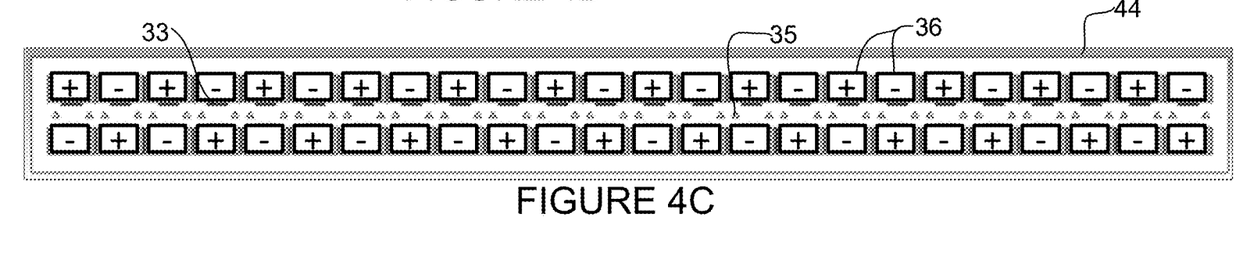
FIG. 4C is a schematic illustrating differential ports in a 2×24 arrangement.

As previously noted, the system may include any number of ports. FIGS. 4A-4C illustrate simulation models with a different number of ports. FIG. 4A illustrates differential port configuration 40 with a 2×4 arrangement of ports 36. Latches 33 and light pipes 35 are also shown. In one example, one unit (e.g., one optical module cage in communication with one PHY) contains four ports 36, thus the configuration shown in FIG. 4A comprises 2 units. FIG. 4B illustrates differential port configuration 42 with a 2×8 arrangement of ports 36 (4 units). FIG. 4C illustrates differential port configuration 44 with a 2×24 arrangement of ports 36 (12 units). It is to be understood that these are only examples and the network device may be configured for receiving any number or type of optical transceivers arranged in any format.

Figure 5A:
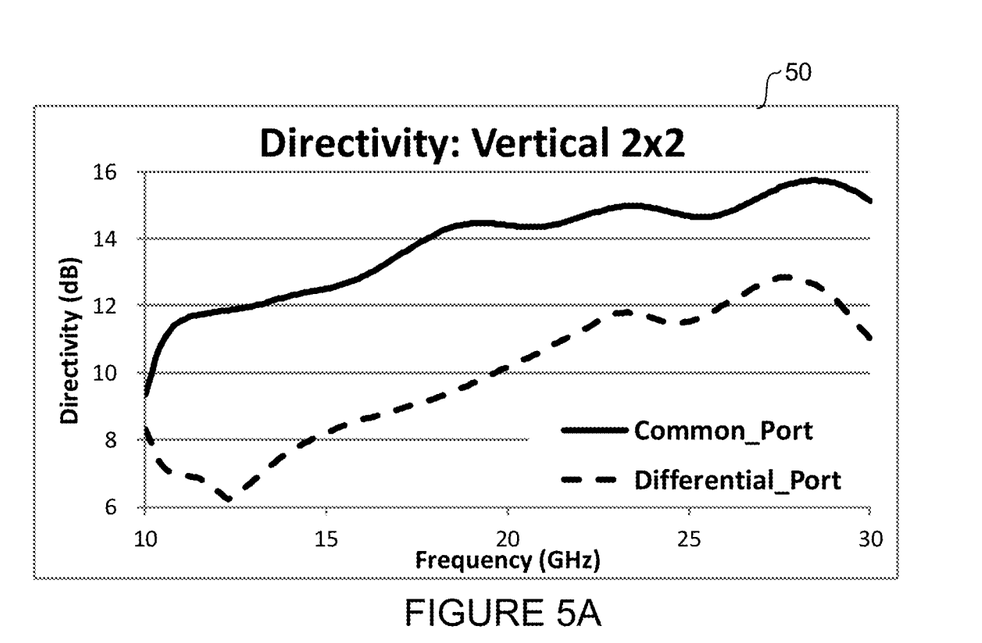
FIG. 5A is a graph illustrating EMI reduction with the differential ports shown in FIG. 3B.
Figure 5B:
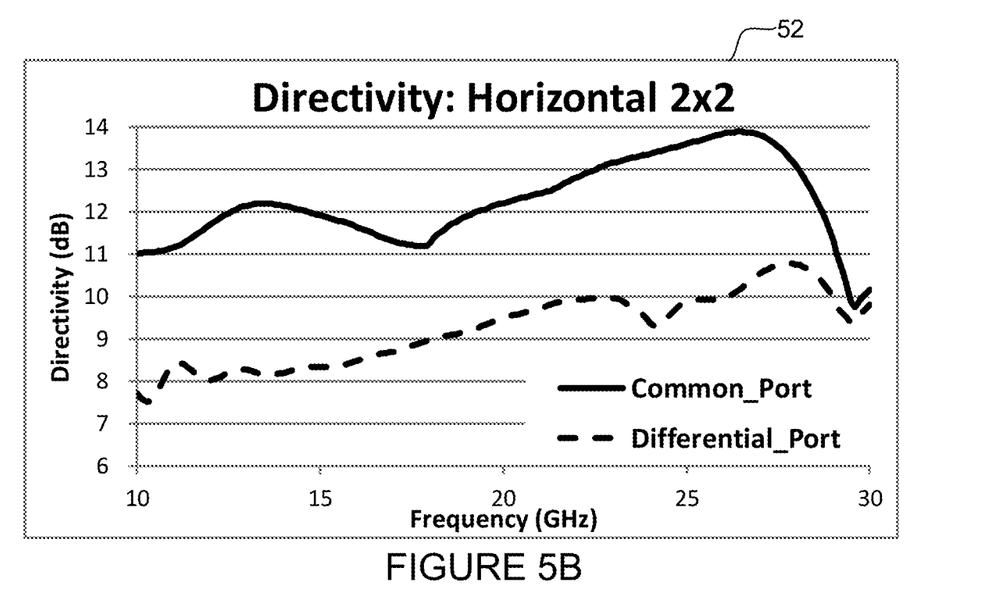
FIG. 5B is a graph illustrating EMI reduction with the differential ports shown in FIG. 3C.
Figure 6:
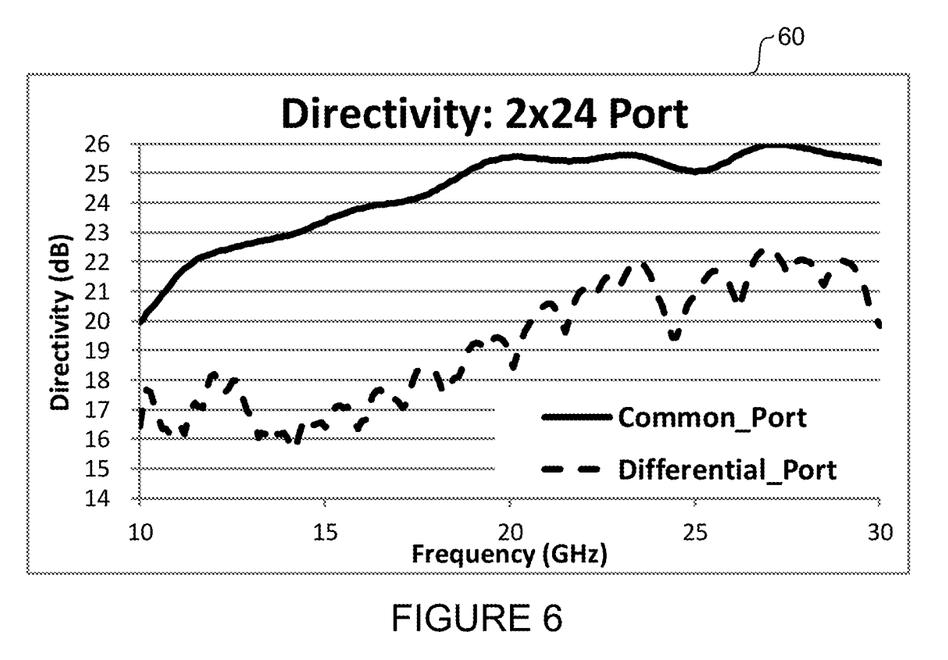
FIG. 6 is a graph illustrating EMI reduction with the differential ports shown in FIG. 4C.

FIGS. 5A, 5B, and 6 contain graphical plots 50, 52, 60, respectively, showing a comparison of electromagnetic radiation from a conventional port arrangement (referred to as common port) in which the phases of four SFP ports (1 unit) connected to a PHY are in phase, to a differential port configuration described herein. Directivity (dB) is plotted against frequency (GHz). FIG. 5A illustrates directivity for 2×2 ports with vertical polarization (FIG. 3B). FIG. 5B illustrates directivity for 2×2 ports with horizontal polarization (FIG. 3C). FIG. 6 illustrates directivity for 2×24 ports (FIG. 4C). As can be seen from the graphs, radiation (EMI) with differential port is less than that of conventional common port across all measured frequencies. In almost full band, differential port is about 3 dB better than common port. Based on example simulation results, it was found that for any unit number, any polarization, any phase delta between units, differential port provides about a 3 dB improvement over common port in almost full band.

In application, different PHY may have different relative phase and the phase delta may be random and uncontrolled. In one example, a 2×4 simulation model had a phase of a first unit (four ports) set to 0° and the other unit (four ports) set to x°. Simulation results for x°=45° showed an approximately 3 dB improvement of differential port over common port. Simulation results for x°=90° showed an approximately 3 dB improvement of differential port over common port. For x°=180°, adjacent units are differential units and EMI is reduced. Differential port still showed an approximately 0.5 dB improvement. Differential unit (phase delta between adjacent unit=180°) was found to provide approximately a 2 dB improvement over common unit (phase delta between adjacent unit=0°).

Figure 7A:
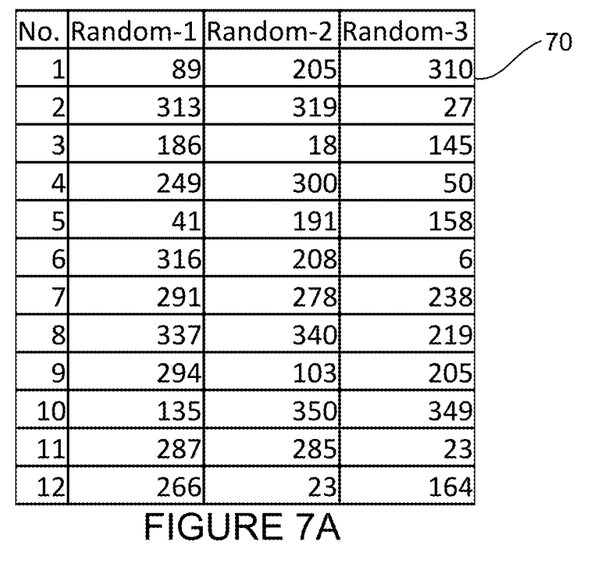
FIG. 7A is a table illustrating random phase combinations for differential port simulation.
Figure 7B:
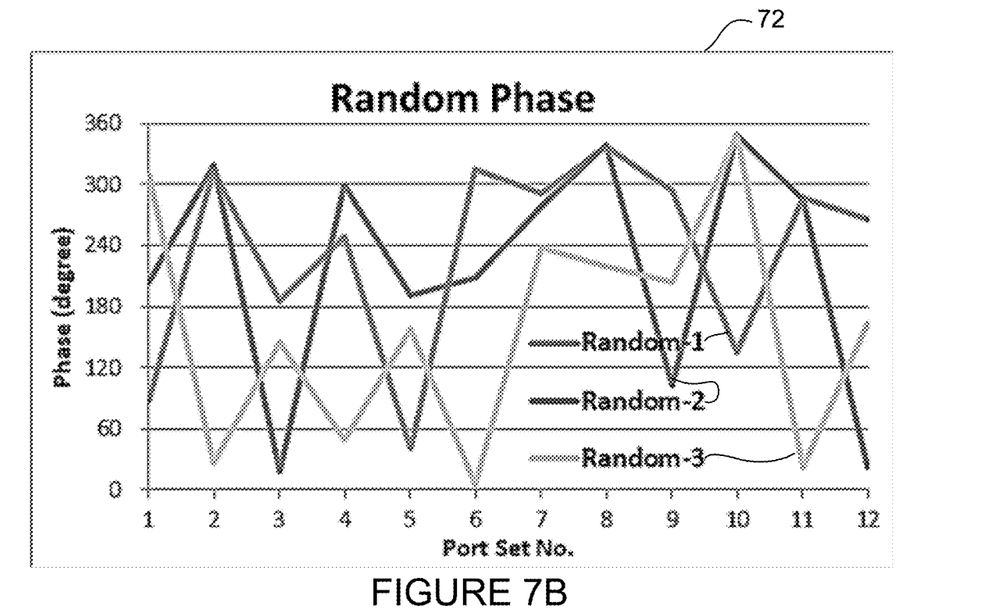
FIG. 7B is a graph illustrating the random phase combinations shown in FIG. 7A.
Figure 8A:
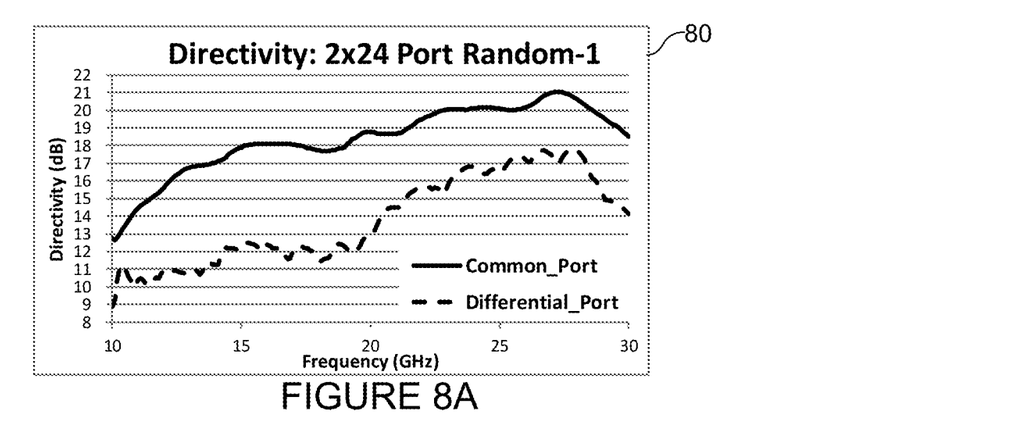
FIG. 8A is a graph illustrating EMI reduction with the differential ports for a Random-1 phase input shown in FIGS. 7A and 7B.
Figure 8B:
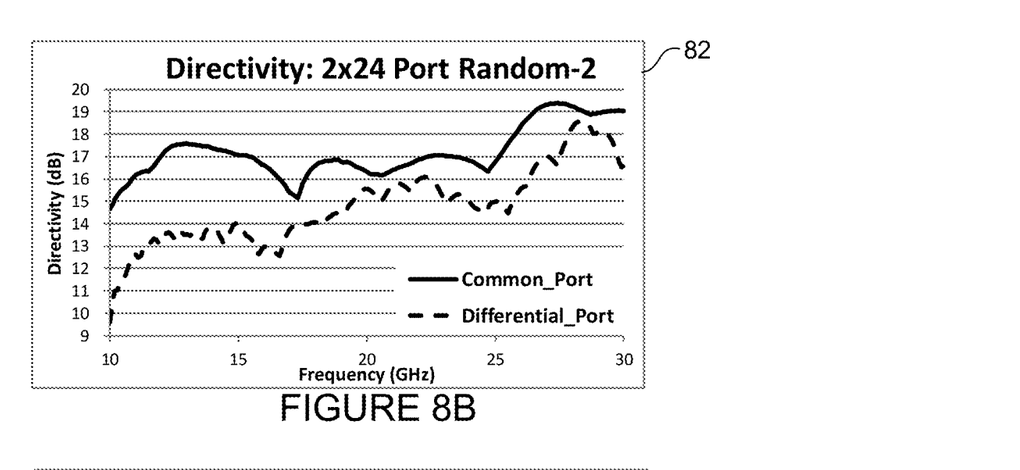
FIG. 8B is a graph illustrating EMI reduction with the differential ports for a Random-2 phase input shown in FIGS. 7A and 7B.
Figure 8C:
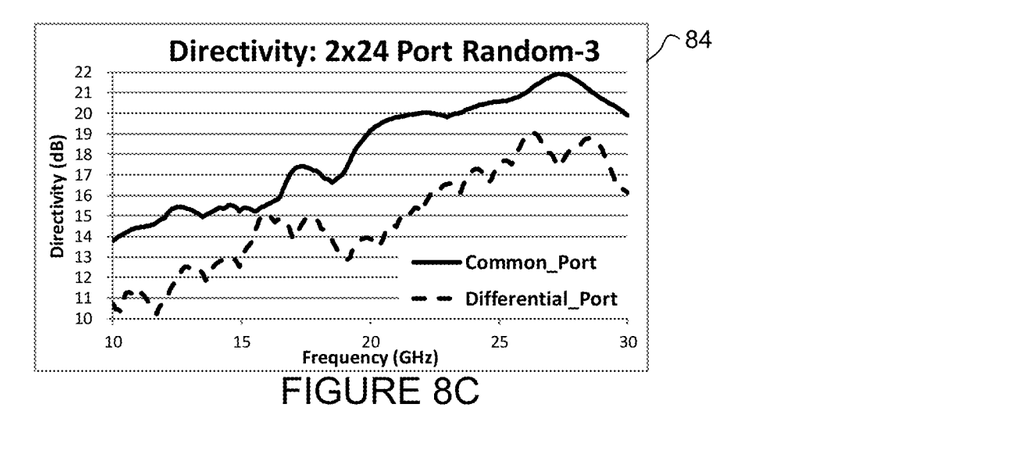
FIG. 8C is a graph illustrating EMI reduction with the differential ports for a Random-3 phase input shown in FIGS. 7A and 7B.

The following describes broadband performance for random phases. Three sets of random phase combinations (Random-1, Random-2, Random-3) (ranging from 0 to 360 degrees) as shown in table 70 of FIG. 7A and graphical plot 72 of FIG. 7B, were applied to a simulation model with 2×24 ports for common port and differential port. Each unit (1-12) (each unit comprising 4 ports) implements one random phase. In this example, the phases are implemented in 10 G, with 10 G being the lowest frequency and higher frequencies more random than 10 G. Graphical plots 80, 82, 84 in FIGS. 8A, 8B, and 8C illustrate performance results for the Random-1, Random-2, and Random-3 phases, respectively. As shown in FIG. 8A, with random phase combination 1, differential port is about 2-6 dB better than common port. As shown in FIG. 8B, with random phase combination 2, differential port is about 1-4 dB better than common port. As shown if FIG. 8C, with random phase combination 3, differential port is about 1-4 dB better than common port.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Figure 9:
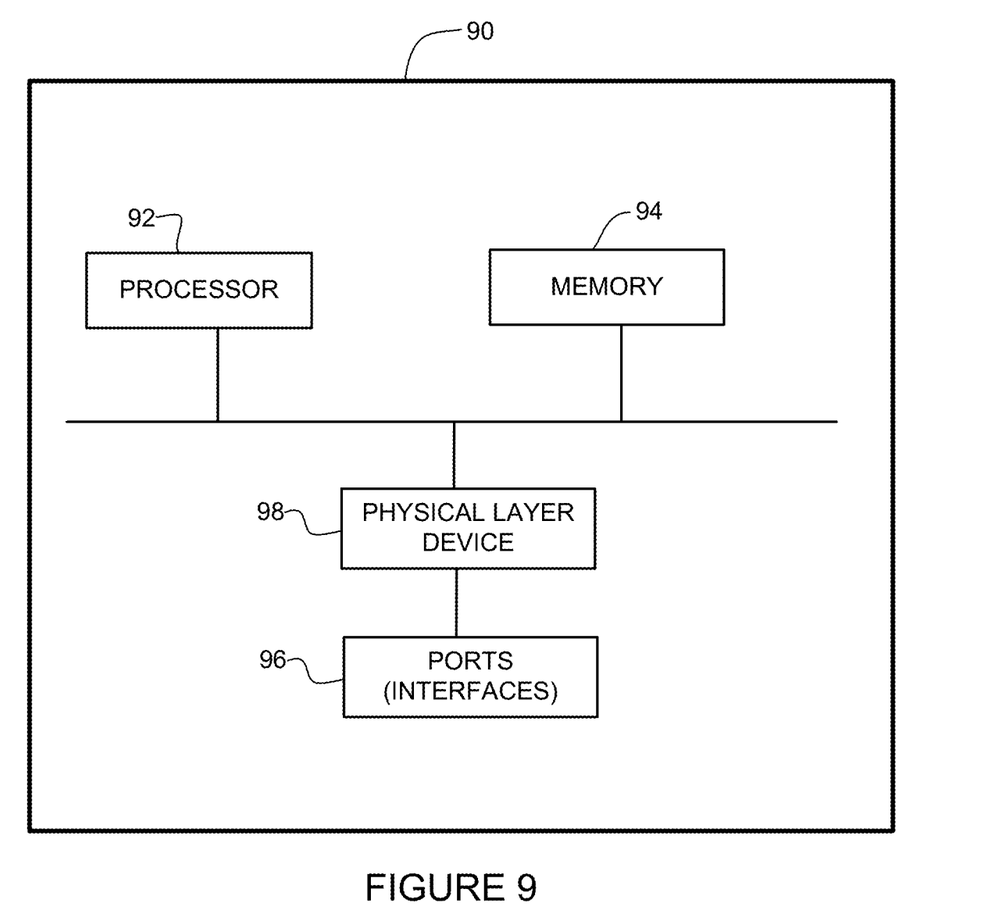
FIG. 9 is a block diagram depicting an example of a multiple port network device on which the embodiments described herein may be implemented.

FIG. 9 illustrates an example of a network device (e.g., switch) 90 that may implement the embodiments described herein. In one embodiment, the network device 90 is a programmable machine that may be implemented in hardware, software, or any combination thereof. The network device 90 includes one or more processor 92, memory 94, ports (interfaces) 96 configured to implement differential port as described herein, and physical layer device 98.

Memory 94 may be a volatile memory or non-volatile storage, which stores various applications, operating systems, modules, and data for execution and use by the processor 92. The network device 90 may include any number of memory components.

Logic may be encoded in one or more tangible media for execution by the processor 92. For example, the processor 92 may execute codes stored in a computer-readable medium such as memory 94. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The processor 92 may process data received from the ports 96. The network device 90 may include any number of processors 92.

The physical layer device (chip) 98 drives a plurality of ports 96. As previously described, there may be more than one physical layer device, each driving a plurality of optical module ports.

The network may comprise any number of interfaces (linecards, ports) for receiving data or transmitting data to other devices.

It is to be understood that the network device 90 shown in FIG. 9 and described above is only an example and that different configurations of network devices may be used. For example, the network device 90 may further include any suitable combination of hardware, software, algorithms, processors, devices, components, interfaces, or elements operable to facilitate the capabilities described herein.

As can be observed from the foregoing, one or more embodiments provide improvement over conventional systems. For example, one or more differential port embodiments described herein may improve EMC radiation performance by about 1-6 dB over common port without incurring extra cost over existing solutions. In simulation tests, differential port shows an improvement in 3D radiation pattern and 2D radiation pattern for a phase delta or random phase, as can be observed in polar plots showing radiation pattern. In common port, energy is concentrated on one side in front of a panel, whereas with differential port, energy is divided among four parts so that Emax (maximum energy) is smaller. The embodiments may be implemented in any type of network device (e.g., switch, router) with any number of ports and for any phase distribution. As previously described, differential port may be implemented through a physical change (at trace) or an electrical parameter change (at PHY).

Although an apparatus and method have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
a plurality of optical module ports in communication with a physical layer device in a network device;
wherein communication of signals from the physical layer device to the optical module ports is configured such that the signals received at the optical module ports adjacent to one another are at different phases to reduce electromagnetic interference associated with the optical module ports; and
wherein each of the optical module ports is in communication with a pluggable optical transceiver module.

2. The apparatus of claim 1 wherein a phase offset between the adjacent optical module ports is approximately 180 degrees.

3. The apparatus of claim 1 wherein four of the optical module ports are in communication with the physical layer device.

4. The apparatus of claim 1 further comprising a plurality of physical layer devices, each of the physical layer devices in communication with a group of the optical module ports.

5. The apparatus of claim 4 wherein the group of the optical module ports in communication with one of the physical layer devices operates at a phase offset from a group of the optical module ports in communication with another one of the physical layer devices.

6. The apparatus of claim 4 wherein a phase offset between the physical layer devices is random.

7. The apparatus of claim 1 wherein a length of a trace between the physical layer device and one of the optical module ports is adjusted to provide said different phases at the adjacent optical module ports.

8. The apparatus of claim 1 wherein an electrical parameter at the physical layer device is adjusted to provide said different phases at the adjacent optical module ports.

9. A switch comprising:
a plurality of physical layer devices; and
a plurality of optical module ports in communication with said plurality of physical layer devices;
wherein communication of signals from each of the physical layer devices to the optical module ports is configured such that the signals received at the optical module ports adjacent to one another are at different phases to reduce electromagnetic interference associated with the optical module ports; and
wherein each of the optical module ports is in communication with a pluggable optical transceiver module.

10. The switch of claim 9 wherein a phase offset between the adjacent optical module ports is approximately 180 degrees.

11. The switch of claim 9 wherein four of the optical module ports are in communication with each of the physical layer devices.

12. The switch of claim 9 wherein a group of the optical module ports in communication with one of the physical layer devices operates at a phase offset from a group of the optical module ports in communication with another one of the physical layer devices.

13. The switch of claim 9 wherein a length of specified traces between the physical layer devices and the optical module ports are adjusted to provide said different phases between the adjacent optical module ports.

14. The switch of claim 9 wherein electrical parameters at the physical layer devices are adjusted to provide said different phases between the adjacent optical module ports.

15. The switch of claim 9 wherein a phase offset between the physical layer devices is random.

16. A method comprising:
transmitting electrical signals from a physical layer device to a plurality of optical module ports; and
offsetting phases between the electrical signals transmitted to the optical module ports adjacent to one another to reduce electromagnetic interference associated with the optical module ports;
wherein each of the optical module ports is in communication with a pluggable optical transceiver module.

17. The method of claim 16 wherein a length of traces between the physical layer device and one of the optical module ports is adjusted to provide said phase offset between the adjacent optical module ports.

18. The method of claim 16 wherein an electrical parameter at the physical layer device is adjusted to provide said phase offset between the adjacent optical module ports.

19. The method of claim 16 wherein said phase offset between the adjacent optical module ports is approximately 180 degrees.

20. The method of claim 16 wherein four of the optical module ports are in communication with the physical layer device.

\* \* \* \* \*